United States Patent [19]

Tegge et al.

[11] 3,969,091

[45] July 13, 1976

[54] PROCESS FOR DESICCANT DRIER REGENERATION

[75] Inventors: Bruce R. Tegge, Madison, N.J.; Barry M. Rosenbaum, New York, N.Y.

[73] Assignee: Exxon Research and Engineering Company, Linden, N.J.

[22] Filed: July 13, 1972

[21] Appl. No.: 271,344

[52] U.S. Cl. ............................. 55/33; 252/411 R; 252/414; 260/80.78; 526/70; 526/339; 526/350
[51] Int. Cl.² ................. B01D 53/02; C07C 11/02; C07C 11/06; B01J 21/20
[58] Field of Search ............... 252/414, 411; 55/33; 260/677 A, 677 AD

[56] References Cited
UNITED STATES PATENTS

| | | | |
|---|---|---|---|
| 2,784,805 | 3/1957 | Odle et al. | 55/33 |
| 3,080,433 | 3/1963 | Hengstebeck | 260/677 AD |
| 3,117,095 | 1/1964 | Brown et al. | 252/414 |
| 3,240,830 | 3/1966 | Dye | 260/669 A |
| 3,304,693 | 2/1967 | Ebry | 55/33 |

*Primary Examiner*—Winston A. Douglas
*Assistant Examiner*—P. E. Konopka

[57] ABSTRACT

A desiccant regeneration system is disclosed which employs polymerization diluent as regeneration medium for monomer recycle desiccant driers in ethylene-alpha olefin copolymerizations and utilizes existing diluent purification systems (i.e., systems employed in polymerization processes for diluent recycle), thereby avoiding separate regeneration facilities, providing high purity regeneration fluid and allowing regeneration at relatively mild temperatures.

11 Claims, 1 Drawing Figure

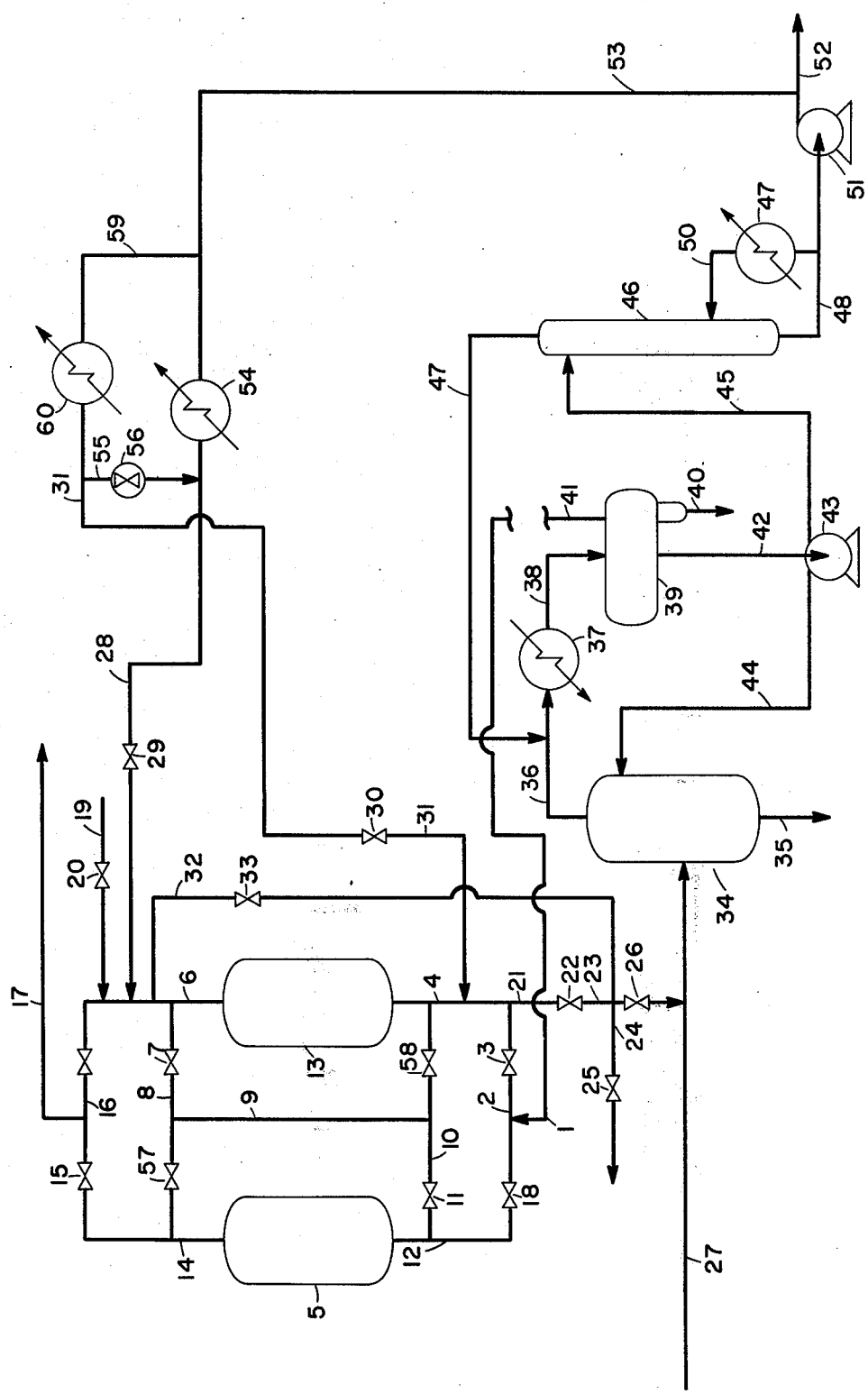

PROCESS FOR DESICCANT DRIER REGENERATION

BACKGROUND OF THE INVENTION

The novel regeneration scheme disclosed herein is employed in ethylene-higher alpha olefin copolymerizations. Typically, the alpha olefin will have the general formula: $R — CH = CH_2$, where R is a $C_1$ to $C_8$ alkyl radical, preferably a $C_1$ to $C_4$ alkyl radical. The alpha olefin may be linear or branched and, while a single alpha olefin is preferred, mixtures may be employed. Illustrative examples include propylene; 1-butene; 1-heptene; 1-decene; 4-methyl-1-pentene; 4,4'-dimethyl-1-hexene; 5,6,6-trimethyl-1heptene, etc.; particularly preferred herein is propylene.

The copolymers may be a terpolymer wherein the third monomer is a nonconjugated diene preferably having 6 to 15 carbon atoms. These types of terpolymers are known as ethylene-propylene-diene terpolymers, i.e., EPDMs. Representative useful dienes include 5-methylene-2-norbornene, 5-ethylidene-2-norbornene, 5vinyl-2-norbornene, 2-ethyl-norbornadiene, 1,4-hexadiene, dicyclopentadiene, 4,7,8,9-tetrahydroindene, etc. Preferred herein is 5-ethylidene-2-norbornene.

The monomeric reactants are typically present in the following amounts, measured per 100 parts of polymerization solvent: about 0.1 to about 10.0, preferably 1.0–6.0 (e.g., 2.75) parts ethylene; about 0.1 to about 20.0, preferably 1.0–15.0 (e.g., 12.5) parts alpha olefin (e.g., propylene); from 0.0 to about 2.0, preferably 0.0–1.0 (e.g., 0.22), parts diene (e.g., 5-ethylidene-2-norbornene). Here, as elsewhere in this specification, all parts given are parts by weight unless otherwise specifically stated.

The catalyst composition preferably employed in making these polymers is a Ziegler-type catalyst and may include a compound of a transition metal (preferably a halide such as titanium tetrachloride or vanadium tetrachloride) together with, as cocatalyst, an organometal compound (e.g., an organoaluminum compound such as diethylaluminum chloride). The mole ratio of cocatalyst to catalyst is generally in the range of 1:1 to 16:1, preferably 1.5:1 to 7:1. The total catalyst composition used in polymerization may vary depending upon the particular components used, but is generally in the range of about 0.01 to about 0.1 parts, preferably 0.05 parts, per 100 parts of diluent.

The polymerization diluent is a nonreactive medium, typically an aromatic hydrocarbon such as toluene, a saturated aliphatic hydrocarbon such as heptane, pentane or hexane, or a chlorohydrocarbon such as tetrachloroethylene. Hexane is preferred.

Reaction temperatures for polymerization are in the range of about 10° to about 75°C., preferably about 25° to about 40°C. (e.g., 30°C.). Reactor pressures should be above the vapor pressure of the reacting medium at reactor temperature. Normally pressures are in the range of about 0 to about 70 atmospheres, preferably about 4 to about 10 atmospheres (e.g., 6 atm.). All steps in the reaction should be carried out in the absence of oxygen, moisture, $CO_2$ or other harmful materials. Therefore, all components of the reaction mixture should be pure and dry and blanketed with inert gas such as nitrogen or methane.

After reaction, the reactor effluent, as withdrawn, normally contains unreacted light monomer (e.g., ethylene and propylene), unreacted termonomer when employed, and copolymer, this being dissolved in diluent to form a solution containing about 3 to about 15, typically 5 parts copolymer per 100 parts diluent, i.e., polymer cement. This effluent is withdrawn at a temperature of about -10°C. to about 70°C., typically 30°C., and a pressure of about 4 to about 10 atmospheres, typically 6 atmospheres.

The reactor effluent is then subjected to flashing at reduced pressures in order to separate as overhead substantially all unreacted ethylene. Flashing conditions are in the range of about 10° to about 50°C., typically 20°C., and about 1.0 to about 2.0 atmospheres, typically 1.2 atmospheres. Under these conditions some unreacted higher alpha olefin (e.g., propylene) and some diluent may also be withdrawn as overhead. This overhead may be directly recycled.

The flash bottoms, containing polymer cement, diluent, unreacted higher alpha olefin, some active and some spent catalyst is then subjected to catalyst quench and deashing (i.e., catalyst residue removal) by contact with water which may contain small amounts of alcohols such as methanol and/or acids such as sulfuric or hydrochloric acid as deashing aids.

After deashing the polymer effluent is subjected to steam stripping to remove as overhead substantially all diluent, steam, substantially all remaining higher alpha olefin and unreacted diene if employed; and, as bottoms, a copolymer slurry in water. This stripping operation is conducted at a temperature in the range of about 60° to about 130°C., typically 110°C., and a pressure of from about 0.5 to about 3 atmospheres, typically 2 atmospheres.

The overhead is fractionated in vaporous form to remove heavy impurities from the polymerization diluent and is then subjected to partial condensation at a temperature of about 20° to about 50°C., typically 30°C., and a pressure of about 1.0 to about 2.0 atmospheres, typically 1.4 atmospheres, in order to condense and liquefy substantially all diluent (e.g., hexane) and steam. Under these partial condensation conditions the higher alpha olefin remains gaseous and is readily separated from the condensed components. However, significant amounts of water vapor may also remain uncondensed; therefore the alpha olefin must be dried prior to recycle to the polymerization reactors. For this purpose driers containing adsorbent materials such as activated alumina are preferred. After a time such materials will, of course, become saturated and must be replaced or regenerated.

THE PRIOR ART

It is known to employ light petroleum solvents (e.g., n-butane) to regenerate adsorbent materials and to recycle the desorbing fluid a number of times until saturated with adsorbate (see U.S. Pat. No. 3,208,157). It is also known to employ polymerization diluent (e.g., toluene) for the regeneration of an adsorbent deactivated by dehydration of a hydrocarbon (e.g., a conjugated diene). However, this latter process (disclosed in U.S. Pat. No. 3,117,095) requires use of a regeneration system separate from the polymerization process (i.e., a "closed loop" system), and employs "wet" diluent as regenerating medium. That is, on "heat up", the diluent employed is simply separated from the water layer by extraction and heated to the desired temperature. No drying step for the diluent is employed. Therefore, the regeneration must necessarily be run at fairly high temperatures due to known water-solvent equilibrium factors in order to obtain acceptable results.

THE PRESENT INVENTION

It has now been discovered that by integration of the monomer drier regeneration system within the overall polymerization process, it is possible to regenerate adsorbent bed driers using polymerization diluent at lower temperatures and/or shorter times than previously possible while, at the same time, attaining improved drying at significant cost savings since a separate "closed loop" regeneration system is avoided and existing process equipment is employed.

The preferred embodiment of the present invention may best be described by reference to the FIGURE. As stated previously, the steam stripper overhead in the copolymerization process is fractionated directly to remove heavy impurities (and diene if employed) from the polymerization diluent. The fractionated overhead vapors are subsequently separated into two streams by partial condensation. One stream, line 41, contains wet vaporous higher alpha olefin. This stream is compressed, cooled and condensed; any water formed as a separate water layer is withdrawn by extraction leaving a wet liquid alpha olefin stream, line 1. (It will become obvious to those skilled in the art that this novel process is equally applicable to regenerating adsorbent bed driers wherein the stream to be dried is in the vapor phase rather than liquid phase as discussed hereafter). The liquid phase formed by the aforementioned partial condensate contains diluent, water, and minor amounts of unreacted alpha olefin. The separate water layer is withdrawn by extraction leaving a wet liquid diluent stream, line 42.

In order to recycle diluent this second stream must necessarily be treated to remove all contaminants, leaving pure, dry liquid diluent. It is a novel feature of this invention that the processing steps which must be employed in order to prepare pure dry diluent are also incorporated in the regeneration process for regeneration of adsorbent bed driers used in the alpha olefin recycle system. This results in considerable cost savings as well as improved drier regeneration since the use of pure dry diluent as regenerating medium allows regeneration at lower temperatures and/or shorter times than previously possible.

The adsorbent bed driers for alpha olefin, as shown in the FIGURE, are indicated by numerals 5 and 13. It should be understood that in commerical operation these driers may be, and preferably are, operated in lead/guard position or a number of driers may be operably connected to be on stream in series or in parallel while others may be in the process of being regenerated. For simplicity, however, drier 5 will be described as on stream while drier 13 is being regenerated. Also for simplicity, the adsorbent described will be activated alumina, the alpha olefin described will be propylene, and the alpha olefin will be in the liquid phase.

Prior to the regeneration step, wet liquid propylene in line 1 is passed through line 2, valve 3, and line 4 to drier 13, wherein moisture is removed by the alumina bed with liquid propylene being passed upwardly therethrough. With driers in lead/guard position, liquid propylene exits drier 13 through line 6, valve 7, and lines 8 and 9, from whence the dried propylene enters guard drier 5 through line 10, valve 11 and line 12. Propylene passes upwardly through drier 5 and exits through line 14, valve 15, and lines 16 and 17, from whence the dried propylene may be recycled to the polymerization reactor.

After a period of time the alumina beds of drier 13 become substantially ineffective because of adsorbed moisture and must be regenerated. Valves 3, 7 and 11 are then closed and valve 18 is opened, thereby permitting wet liquid propylene to pass through line 2, valve 18 and line 12 to drier 5. Propylene passes upwardly through drier 5, moisture is adsorbed by the alumina beds in said drier, and exits as dry propylene for recycle through line 14, valve 15, and lines 16 and 17. Drier 13 is now ready for regeneration.

The first step in the regeneration process requires removal of liquid propylene remaining in drier 13. Conventionally, inert gases have been employed for this procedure. However, these gases present the possibility of external contaminants being introduced. Therefore, it is preferred to flush the drier with dry propylene vapors (or even dry liquid diluent) easily obtained from the polymerization process. The propylene vapors are introduced through line 19 and valve 20 and passed downwardly through line 6 to drier 13. The flushed liquid propylene exits the drier through line 4, line 21, valve 22, lines 23 and 24, and valve 25, from whence it may be recycled to line 1 by means not shown. After all liquid propylene has been flushed from the drier, valves 20 and 25 are closed and the drier is depressured by opening valves 22 and 26 and releasing propylene vapors through lines 4, 21 and 23 into line 27.

At this point the alumina bed is regenerated by passing downwardly therethrough pure, dry diluent, preferably in vaporous form, which is obtained from the diluent recycle system as more fully described hereafter. The diluent is introduced to drier 13 through line 28 and valve 29, and passed downwardly through line 6.

Temperature of regeneration, since pure, dry diluent is employed as regenerating medium, may be as low as about 100°C., and, in fact, it is not even necessary in order to achieve good regeneration that the diluent be vaporous. Thus, it is possible to avoid the later step of "cool down" entirely if desired. Of course, at low temperatures, equilibria between the water in the alumina bed and that adsorbed by the diluent are reached more slowly. Consequently, it is desirable to maintain regeneration temperatures in the range of about 150° to about 200°C., more preferably about 170°C., although temperatures as high as 250°C. are acceptable. Pressures are generally in the range of about 1 to about 15 atmospheres, preferably about 1 atmosphere to about 6 atmospheres, typically 4 atmospheres. At such temperatures and pressures the diluent will be vaporous. Regeneration times may vary from about 5 to about 40 hours, normally from 10 to 30 hours, typically 20 hours.

The regenerating medium employed herein is "bone dry", i.e., has less than about 1 wppm of water, as opposed to prior art processes employing "wet" media. Thus, it can be seen that at any given temperature, once equilibrium has been established between the regenerating medium and the desiccant bed, the desiccant will approach a lower water content than if wet regenerating media were employed. As a result, the instant process allows regeneration at significantly shorter times than previously possible at equivalent regeneration temperatures, or allows lower regeneration temperatures to attain similar efficiencies. Further, by adjusting conditions it is within the skill of the art to achieve both shorter times and lower temperatures. In addition, the novel process permits more efficient regenerations in that the desiccant bed will contain less residual moisture after regeneration than with prior art processes.

The diluent, after use in regeneration, contains any heavy tars, etc., which may have formed on the desiccant bed. Diluent is recovered from drier 13 by opening valves 22 and 26 and allowing diluent to pass downwardly through lines 4, 21 and 23 to line 27, where it is combined with steam stripped overhead from the polymerization process prior to treatment of said overhead vapors in the diluent purification system, said system being necessary to allow recycling of diluent in the polymerization process.

After regeneration, depending on the temperatures employed, it may be desirable to decrease temperature in the drier prior to placing said drier on stream. In the instant process this is readily accomplished by use of dry liquid polymerization diluent. Valve 22 is closed and pure dry liquid diluent, again from the polymerization process as more fully described hereafter, is introduced to the drier by opening valve 30, allowing diluent to pass upwardly through the drier through lines 31 and 4. Cooling diluent exits drier 13 through lines 6 and 32 and open valve 33 to line 23, through which it passes downwardly through valve 26 to line 27, where it is combined with steam stripped overhead prior to diluent recycle treatment.

This cool-down step is continued until the temperature of the desiccant bed has decreased to a temperature of from about 60°C. to about 30°C., preferably 40°C., at a pressure of about 1.5 atmospheres. Liquid diluent is then pressured from the bed by use of dry propylene vapor obtained through line 19 and valve 20 from downstream process equipment now shown.

The diluent exits drier 13 and passes to line 27 in the same manner as vaporous diluent used in regeneration. Drier 13 is now ready to be placed on steam.

As noted previously, line 27 is the conduit through which passes diluent, alpha olefin, water, impurities, etc., in vapor form from the aforementioned steam stripping operation. To this conduit, through line 23 and valve 26, is added at various times during monomer drier regeneration, vaporous and liquid diluent used in said regeneration and containing some alpha-olefin, water, tars and other impurities adsorbed from the drier beds. By this combination and the use of a portion of purified recycle diluent as regeneration medium, it is possible to utilize the diluent purification system both for diluent recycle and as an integral part of the monomer drier regeneration facilities, thereby avoiding completely separate regeneration facilities.

The diluent purification system may be integrated with the monomer regeneration system, as seen by the FIGURE, as follows: After line 23 feeds into line 27, the combined steam stripped overhead and vaporous and liquid diluent used in drier regeneration containing diluent, water, alpha olefin and contaminants, etc., is preferably fed to fractionating column 34.

Column 34 is operated at a temperature in the range of about 110° to about 60°C., typically 75°C., and a pressure of about 3.0 to about 1.0 atmospheres, typically 1.8 atmospheres. Under these conditions, substantially all heavy impurities and unreacted diene are withdrawn as bottoms through line 35. As overhead, diluent, water, and unreacted alpha olefin are withdrawn in gaseous form through line 36, partially condensed in condenser 37 and passed to settler drum 39 through line 38.

Condenser 37 is operated at temperatures in the range of about 20° to about 50°C., typically 30°C., and pressures of 1.0 to 3.0 atmospheres, typically 1.3 atmospheres. Under these conditions unreacted alpha olefin and any light impurities will remain gaseous, are withdrawn via line 41, and may be recycled to the wet vaporous alpha olefin stream prior to compression, etc., of that stream as heretofore described. Wet alpha olefin which passes through conduit 41 eventually enters the desiccant driers through line 1 after suitable processing not described herein.

Water is withdrawn from drum 39 through line 40 and wet diluent is withdrawn through line 42 by pump 43. A portion is recycled to fractionator 34 through line 44 and the remainder is passed to drying tower 46 via line 45.

Tower 46 is operated at a temperature in the range of about 90° to about 150°C., typically 130°C., and a pressure of about 2 to about 10 atmospheres, typically 5 atmospheres. Under these conditions, any remaining water and any remaining dissolved unreacted alpha olefin are withdrawn as overhead through line 47 and recycled to line 36. Pure dry liquid diluent is withdrawn as bottoms through line 48, a portion recycled to drying tower 46 through line 50 and heat exchanger 49, and the remainder passed through pump 51 to line 52.

The majority of this dry diluent is recycled to the polymerization reactor. A minor portion is diverted through line 53 for use as regeneration medium for the alumina driers. By minor portion is meant amounts of from about 2 to 10%, typically about 5%. The temperature of this diverted liquid diluent is normally in the range of about 90° to about 150°C., typically 130°C.

The diluent in line 53 to be used as regenerating medium may be passed to vaporizer 54 where the diluent may be heated to desired temperatures for regeneration of drier 13 to which it is passed through line 28, valve 29, and line 6 as heretofore described.

A portion of diluent in line 53 may be diverted therefrom prior to vaporization through line 59 and cooler 60 to line 31. This liquid diluent at 30° to 50°C. may be used as heretofore described, to cool down the drier after regeneration. Further, the liquid diluent in line 31 may also be employed to further control the temperature of vaporized diluent in line 28 by admixture therewith through line 55 and control valve 56.

What is claimed is:

1. A method for regenerating a desiccant drier deactivated by the dehydration of a higher alpha olefin, said alpha olefin being used in a process comprising copolymerization of ethylene and said higher alpha olefin and employing Ziegler-type catalysis which comprises the steps of:
    a. contacting said drier with a portion of dry recycle polymerization diluent for a period of time sufficient to remove substantially all adsorbed water therefrom and reactivate the desiccant in said drier, and
    b. passing the diluent used in regeneration from said drier to a polymerization diluent purification system employed for recycle of diluent in the copolymerization process.

2. The method of claim 1 wherein the dry polymerization diluent used in regeneration of said drier is heated to a vaporous state prior to contact with said drier and which method additionally comprises the subsequent step of contacting said drier after reactivation of said desiccant with a portion of dry liquid recycle polymerization diluent for a period of time sufficient to cool said desiccant to a temperature suitable for dehydration of said alpha olefin.

3. The method of claim 2 wherein said diluent is hexane.

4. The method of claim 2 wherein the desiccant is cooled to a temperature in the range of from about 60°C. to about 20°C.

5. The method of claim 1 wherein said copolymerization process is a terpolymerization process and the termonomer is a nonconjugated diene.

6. The method of claim 1 wherein said desiccant drier is an alumina drier.

7. The method of claim 1 wherein said higher alpha olefin is propylene.

8. A method of regenerating a desiccant drier deactivated by the dehydration of liquid propylene, said propylene being subsequently used in a process comprising the terpolymerization of ethylene, propylene, and a nonconjugated diene and employing Ziegler-type catalysis which comprises the steps of:

a. flushing said drier with propylene vapors to remove liquid propylene therefrom;

b. contacting said drier with a portion of dry, heated, vaporous recycle polymerization diluent for a period of time sufficient to remove substantially all adsorbed water therefrom and reactivate the desiccant in said drier, said vaporous diluent passing downwardly through said drier;

c. passing a portion of dry liquid recycle polymerization diluent upwardly through said drier after reactivation of said desiccant for a period of time sufficient to cool said desiccant to a temperature suitable for dehydration of liquid propylene; and d. passing the vaporous diluent of step (b) and the liquid diluent of step (c), after passage of each through said drier, to a polymerizaion diluent purification system for recycle of diluent in the terpolymerization process.

9. The method of claim 8 wherein the diluent is hexane.

10. The method of claim 8 wherein the desiccant is cooled to a temperature in the range of from about 60°C. to about 20°C.

11. The method of claim 10 wherein the desiccant is alumina.

* * * * *